(12) United States Patent
Bos et al.

(10) Patent No.: US 8,367,772 B2
(45) Date of Patent: Feb. 5, 2013

(54) CROSSLINKED ARAMID POLYMER

(75) Inventors: Johannes Bos, Apeldoorn (NL);
Wilhelmus Hendrikus Johannes Nijenhuis, Huissen (NL)

(73) Assignee: Teijin Aramid B.V., Arnhem (NL)

( * ) Notice: Subject to any disclaimer, the term of this patent is extended or adjusted under 35 U.S.C. 154(b) by 340 days.

(21) Appl. No.: 12/988,001

(22) PCT Filed: Apr. 22, 2009

(86) PCT No.: PCT/EP2009/054819
§ 371 (c)(1),
(2), (4) Date: Oct. 15, 2010

(87) PCT Pub. No.: WO2009/130244
PCT Pub. Date: Oct. 29, 2009

(65) Prior Publication Data
US 2011/0034666 A1    Feb. 10, 2011

(30) Foreign Application Priority Data

Apr. 25, 2008   (EP) .................................... 08155185

(51) Int. Cl.
*C08F 8/30*      (2006.01)
*C08L 31/00*     (2006.01)
*C08L 33/00*     (2006.01)
*C08L 35/00*     (2006.01)
*C08L 77/00*     (2006.01)

(52) U.S. Cl. ...................... 525/183; 525/178; 525/329.7; 525/329.9; 525/420; 525/426

(58) Field of Classification Search ................ 525/178, 525/183, 329.7, 329.9, 420, 426
See application file for complete search history.

(56) References Cited

U.S. PATENT DOCUMENTS

| | | | |
|---|---|---|---|
| 3,063,966 A | 11/1962 | Kwolek et al. | |
| 3,154,610 A | 10/1964 | Denyes | |
| 3,414,645 A | 12/1968 | Morgan, Jr. | |
| RE30,352 E | 7/1980 | Kwolek et al. | |

FOREIGN PATENT DOCUMENTS

| | | |
|---|---|---|
| EP | 0 577 313 A2 | 1/1994 |
| EP | 1 805 248 A1 | 7/2007 |
| JP | A-11-172012 | 6/1999 |
| WO | WO 2006/045517 | 5/2006 |
| WO | WO 2008/028605 * | 3/2008 |
| WO | WO 2008/028605 A2 | 3/2008 |

OTHER PUBLICATIONS

Sweeny, "Improvements in Compressive Properties of High Modulus Fibers by Crosslinking," Journal of Polymer Science: Part A: Polymer Chemistry, vol. 30, pp. 1111-1122, 1992.

Markoski et al., "Cross-Linkable Copolymers of Poly(*p*-phenyleneterephthalamide)," Chem. Mater., vol. 5, pp. 248-250, 1993.

Sweeney et al., "Influence of Thermal Treatment Conditions on the Recoil Compressive Strength of Kevlar-29 Fibers," High Performance Polymers, vol. 14, pp. 133-143, 2002.

Sinclair, "A Bending Method for Measurement of the Tensile Strength and Young's Modulus of Glass Fibers," Journal of Applied Physics, pp. 380-386, Aug. 26, 1949.

Greenwood et al., "Compressive Behaviour of Kevlar 49 Fibres and Composites," Journal of Materials Science, vol. 9, pp. 1809-1814, 1974.

International Search Report mailed Dec. 22, 2009 for International Application No. PCT/EP2009/054819.

* cited by examiner

*Primary Examiner* — James J Seidleck
*Assistant Examiner* — Timothy Meagher
(74) *Attorney, Agent, or Firm* — Oliff & Berridge, PLC

(57) ABSTRACT

A crosslinked aramid polymer comprising a first aramid backbone which is crosslinked through a poly(meth)acrylic acid with a second aramid backbone. The crosslinked aramid polymer is obtained by polymerizing a monomeric aromatic diamine with a monomeric aromatic diacid, or halide or ester thereof in the presence of poly(meth)acrylic acid, followed by a curing step. The crosslinked aramid polymer is crosslinked through its amide bonds and can be made to a fiber, film or fibrid.

10 Claims, No Drawings

CROSSLINKED ARAMID POLYMER

TECHNICAL FIELD

The invention relates to a crosslinked aramid polymer, a method for crosslinking aramid polymer, and products obtained thereof.

BACKGROUND

Aramid polymers have been known for decades, but improvement of some of their properties is still an object. It was the objective of the present invention to provide aramid derivatives and fibers thereof having high compressive properties, high tenacity, and high breaking force.

Several attempts to improve compressive properties of polymeric fibers in general, and aramid fibers in particular, are known. Sweeny reported the thermal elimination of activated aryl halogens followed by the combination of the aryl free-moieties, in order to create inter-chain covalent bonding (Sweeny, W., *Improvements in compressive properties of high modulus fibers by crosslinking. J. Polym. Sci., Part A: Polym. Chem.*, 1992, 30(6): p. 1111-1122). The increase in compressive strength was accompanied by a significant drop in fiber toughness. Markoski (Markoski, L. J., et al., *Cross-linkable copolymers of poly(p-phenyleneterephthalamide); Chem. Mat.*, 1993, 5(3): p. 248-250) investigated the (partial) substitution of terephthalic acid by cross-linkable benzocyclobutene containing terephthalic acid in poly(p-phenyleneterephthalamide). Other approaches based on several types of post treatments were reported by Sweeney (Sweeney, D. J., et al., *Influence of Thermal Treatment Conditions on the Recoil Compressive Strength of Kevlar-29 fibers. High Perform. Polym.*, 2002, 14(2): p. 133-143) who investigated the influence of heat treatments on the compressive properties of aramid fibers, however at the cost of the tensile strengths.

In JP 11172012 crosslinking of an aramid silicone polymer was described, but this process was performed using a mixed polymer, not typically an aramid polymer. This material was suitable for making contact lenses, and no compressive strength improvement was discovered or disclosed.

In WO 2008/028605 crosslinking of aramids was described wherein the aromatic moieties of the aramid were modified to obtain cross-linkable copolymers by substitution with carboxylic acid and hydroxy groups. These aramids were crosslinked through their aromatic hydroxy and/or carboxylic acid groups.

SUMMARY

Contrary to most of the prior art attempts wherein modified copolymers were used, the present invention provides crosslinked aramid polymers, without modifying the aramid backbone by including other monomers than the commonly used aromatic diamines and dichlorides to obtain cross-linkable copolymers. The aramid polymers of this invention therefore do not contain hydroxy and carboxylic acid groups for making the co-polymer cross-linkable. Standard spin dope preparation and dry jet wet spinning techniques could be used without modifications as opposed to earlier described attempts were spinning of fibers was proven to be difficult or impossible. Fibers were prepared from the blends of the invention having a compressive strength as high as 0.88 GPa at compressive strain of 0.63%, without significant loss of tenacity at break and lower breaking force loss than of non-crosslinked aramid.

To this end the invention pertains to crosslinked aramid polymer comprising a first aramid backbone which is crosslinked through a poly(meth)acrylic acid with a second aramid backbone. The first aramid backbone thereby is crosslinked through an amide group with an amide group of the second aramid backbone.

The preparation of the spin-dopes and the fiber spinning process were not greatly influenced by the incorporation of poly(meth)acrylic acid linkers. Fibers from crosslinked poly-p-phenylene terephthalamide (PPTA) were prepared successfully and showed improved properties, in particular with regards to compressive strength in comparison with a reference PPTA yarn (not crosslinked).

The present invention also relates generally to highly oriented polymeric fibers spun from lyotropic solutions. In addition, the invention relates to the fibers, film, and fibrids spun from the previously mentioned spin dopes, showing improved physical and mechanical properties.

In another objective the invention relates to a method for obtaining the crosslinked aramid polymer by polymerizing a monomeric aromatic diamine with a monomeric aromatic diacid, or halide or ester thereof in the presence of poly(meth)acrylic acid, followed by a curing step. Preferably, monomeric aromatic diester or dihalide is used (for example dicarboxoyl chlorides), which do not contain aromatic hydroxy or aromatic carboxylic acid, or other substituents that make the copolymer crosslinkable. The monomers can be mixed together in common solvents, such as sulfuric acid, NMP, NMP/CaCl$_2$, and the like.

The curing step can be a thermal curing step, optionally performed under vacuum. Preferably, curing is performed between 300 and 450° C. Preferred polymers are para-aramids, such as PPTA and Technora®, which do not contain aromatic substituents that can interfere with the crosslinking through the amide groups.

The degree of crosslinking of a polymer blend can easily be determined by usual curing and dissolution tests. Dissolution tests discriminate between uncured and cured polymers. If an aramid particles having a diameter of about 50 μm does not dissolve in H$_2$SO$_4$ it is considered that this particle is cured (i.e. crosslinked).

The aramid polymer is crosslinked with poly(meth)acrylic acid (PAA), the structure of which is:

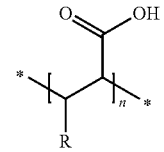

If R=H the above structure is polyacrylic acid, and for R=CH$_3$ this is polymethacrylic acid, and n can have a value between 2 and 14000.

The underlying chemistry of the crosslinking reaction is unknown, but possibly it starts by a proton abstraction reaction as follows (shown for R=H):

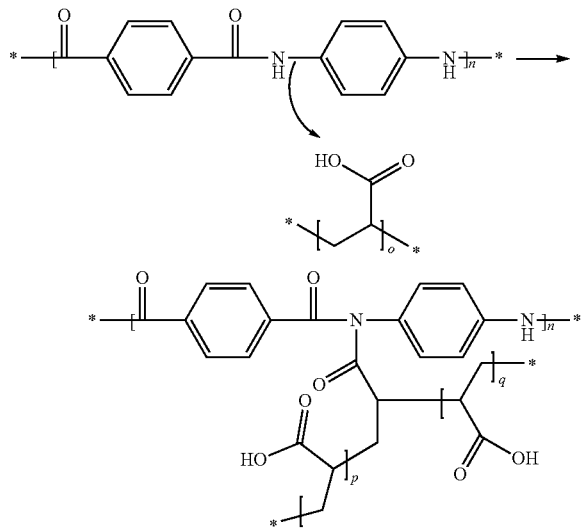

wherein p+q+1=o.

The aramid in this figure is the first backbone. A second aramid backbone will then react in a similar manner with one of the other carboxyl groups of the poly(meth)acrylic acid moiety. Further crosslinking is also possible, wherein a third, fourth, etc aramid backbone reacts in a similar manner with one of the carboxylic groups of the poly(meth)acrylic acid moiety. The crosslinking according to this invention is through the amide groups, not through substituents at the aromatic moieties as was used in the prior art.

Fibers spun from anisotropic solution of high molecular weight aromatic polyamides are known in the literature. The process of making wholly aromatic polyamides is taught by Kwolek et al. in U.S. Pat. No. 3,063,966. The processing for spinning wholly aromatic polyamide fibers from anisotropic solutions is taught in U.S. Pat. No. 3,154,610 and U.S. Pat. No. 3,414,645. The preparation of anisotropic dopes of aromatic polyamides is disclosed in U.S. RE 30,352.

The fibers can be spun from anisotropic solutions of aromatic polyamides in sulfuric acid, but other solvents such as NMP/calcium chloride ($CaCl_2$) can also be used. Both the high molecular weight aromatic polyamides as well as the poly(meth)acrylic acids were prepared using conventional polycondensation reaction techniques or were commercially obtained. The spin dopes could be prepared by blending the two components together and mixing them with sulfuric acid. The fibers can be spun via the known dry jet wet spinning procedure.

In an alternative embodiment an aramid polymer is mixed with poly(meth)acrylic acid in the presence of sulfuric acid, optionally shaped into a product such as a fiber, the sulfuric acid is removed, for instance by a washing procedure, followed by a curing step. Such curing can be done by heating the polymer or the shaped product.

The invention is further illustrated by the following examples.

DETAILED DESCRIPTION OF THE EMBODIMENTS

Polymerization

A clean and dry 2 L flask supplied with a mechanical stirrer, $N_2$-inlet and outlet and vacuum supply was charged with 21.649 g of PPD (para-phenylenediamine; Aldrich), 0.974 g of polyacrylic acid (Aldrich) and 300 mL of dry $NMP/CaCl_2$ having a $CaCl_2$ concentration of 10.6 wt % (NMP=N-methylpyrrolidone). The reactor was purged twice with nitrogen and the mixture was stirred for 40 min at 150 rpm while sonicating.

The flask was cooled to 10° C. with ice/water. After removing the coolant, the stirring speed was set at 320 rpm and 40.643 g of TDC (terephthaloyl dichloride; DuPont) was brought into the vessel through a funnel. The flask was rinsed twice with 150 mL of dry $NMP/CaCl_2$. The vessel was closed and the mixture was allowed to react for at least 20 min under nitrogen flush.

The crumbled product together with demi-water was gently added into a Condux LV15 15/N3 coagulator and the mixture was collected on a stainless steel filter. The product was washed 4 times with 5 L of demi-water, collected in a 2 L glass beaker and dried under vacuum for 24 h at 80° C. to obtain a powdery product, which has a relative viscosity of 5.77.

For comparison, PPTA (poly para-phenylene terephthalamide) obtained without polyacrylic acid has a relative viscosity of 5.58.

Curing

A sample of about 0.5 g of the above polymer was brought into a test tube, evacuated and heated to the temperature for the period as given in the Table I.

Microscopy

A few drops of sulfuric acid (99.8%) were carefully added tot a powdery sample or short filaments, which was placed on a glass slide. The sample was covered with a large glass cover slip and viewed with an Olympus BX-51 optical microscope in phase contrast mode. Images were taken with a Colorview III CCD camera and processed with analySIS V.

The results are presented in Table I (powdery sample) and Table II (yarns).

Linear mechanical properties were determined as described in EP 1805248.

The breaking force loss is calculated as follows:

$$BF\ loss = -(BF_T - BF_I)/BF_I * 100\%$$

wherein $BF_T$=breaking force of heat treated yarn and $BF_I$=breaking force of yarn before heat treatment.

The compressive strength is determined by means of the elastica loop test (ELT) as described by D. Sinclair, J. App. Phy., vol. 21 (1950), 380-385 and J. H. Greenwood and P. G. Rose, Journal of Materials Science 9 (1974), 1809-1814 and is calculated as follows:

$$C.S. = 1.43 * M.d/c'$$

wherein C.S. is the compressive strength, M is the modulus, d is the diameter of a filament and c' is the value of the c-ax of which the c/a-ratio starts to deviate from 1.34.

TABLE I

Dissolution behavior of PPTA and PPTA/PAA

| Temperature | | Dissolution in $H_2SO_4$. | |
|---|---|---|---|
| (° C.) | Time (min) | PPTA*# | PPTA with PAA* |
| 250 | 2 | 1 | 1 |
|  | 3 | 1 | 1 |
|  | 5 | 1 | 2 |
|  | 10 | 1 | 2 |
| 300 | 2 | 1 | 2 |
|  | 3 | 1 | 2 |
|  | 5 | 1 | 2 |
|  | 10 | 1 | 2 |
| 350 | 2 | 1 | 3 |
|  | 3 | 1 | 3 |
|  | 5 | 1 | 3 |
|  | 10 | 1 | 3 |
| 400 | 2 | 1 | 3 |
|  | 3 | 1 | 3 |
|  | 5 | 1 | 3 |
|  | 10 | 3 | 3 |

Comparison
*The numbers have the following meanings:
1: Particle dissolves completely;
2: Swelling of the particle (low curing);
3: Particle remains almost unaffected (cured particles).

Yarn Properties

PPTA and PPTA/PAA yarns were made according to the method as described in EP1805248.

19.5 parts by weight of PPTA were dosed into a 20 mm twin screw extruder (40 D). 81.5 parts by weight $H_2SO_4$/PAA=98/2 were injected into the twin screw extruder at 4.75 D. The sulfuric acid had a purity of 99.8%. The total throughput was 800 g/h. The extruder speed was about 300 rpm. The vacuum for degassing was about 50 mbar (absolute pressure). The output pressure extruder was around 30 bar. The temperature of the dissolving process was 85° C. Fibers were obtained by spinning in a water bath by air gap spinning using a 51 hole/75 μm spinneret followed by washing and drying the yarn. The air-gap was about 5 mm.

The yarns were submitted to a heat treatment procedure under a blanket of nitrogen which was carried out at the temperatures of Table II (250 to 400° C.) at a residence time of 28 seconds.

Comparison Example 19.5 parts by weight of the PPTA were dosed into a 20 mm twin screw extruder (40 D). 81.5 parts by weight $H_2SO_4$ were injected into the twin screw extruder at 4.75 D. The sulfuric acid had a purity of 99.8%. The total throughput was 800 g/h. The extruder speed was about 300 rpm. The vacuum for degassing was about 50 mbar (absolute pressure). The output pressure extruder was around 30 bar. The temperature of the dissolving process was 85° C. Fibers were obtained by spinning in a water bath by air gap spinning using a 51 hole/75 μm spinneret followed by washing and drying. The air-gap was about 5 mm.

The yarns were submitted to a heat treatment procedure under a blanket of nitrogen which was carried out at the temperatures of Table II (250 to 400° C.) at a residence time of 28 seconds.

The yarn properties and essential machine settings are given in Table II:

TABLE II

| Polymer | T oven ° C. | Yarn Force cN | LD dTex | BT mN/tex | BF loss % | Strain % | Modulus GPa | Energy at break J/g | Compressive strength Gpa |
|---|---|---|---|---|---|---|---|---|---|
| PPTA + | — | — | 94.1 | 1960 | — | 2.94 | 93 | 28.9 | 0.60 |
| 2% PAA | 250 | 450 | 88.7 | 2050 | 1.8 | 2.22 | 130 | 22.9 | 0.79 |
|  | 300 | 447 | 87.5 | 2020 | 4.3 | 2.16 | 132 | 21.9 | 0.81 |
|  | 400 | 268 | 84.7 | 2027 | 7.1 | 2.04 | 139 | 20.8 | 0.88 |
| PPTA | — | — | 93.3 | 2220 | — | 3.26 | 95 | 35.8 | 0.70 |
| (comparison) | 250 | 467 | 88.9 | 2140 | 8.3 | 2.32 | 132 | 24.8 | 0.79 |
|  | 300 | 400 | 87.6 | 2120 | 10.5 | 2.25 | 133 | 24.0 | 0.75 |
|  | 400 | 236 | 85.8 | 1980 | 17.9 | 2.04 | 137 | 20.3 | 0.88 |

LD = linear density
Yarn Force = force at which the yarns were pulled through the oven.
BT = tenacity at break
BF = breaking force*

The heat treated PPTA/PAA yarns swelled in sulfuric acid while the heat treated PPTA yarns were dissolved within 2 min.

These results show that the compressive strength of both PPTA and PPTA/PAA yarns increase with heat treatment at increasing oven temperature up to 0.88 GPa, but that contrary to PPTA yarn, the PPTA/PAA yarn much better retains a high tenacity (PPTA/PAA loss of tenacity 1.5%; PPTA loss of tenacity 7.5%) and breaking force.

The invention claimed is:

1. A crosslinked aramid polymer comprising a first aramid backbone which is crosslinked through an amide group by a poly(meth)acrylic acid with an amide group of a second aramid backbone, wherein the first and second aramid backbones are derived from aromatic diamines and aromatic diacids, halides, or esters thereof, wherein said diamines and diacids, halides, or esters thereof do not contain additional crosslinkable substituents.

2. The crosslinked aramid polymer of claim 1 wherein the aramid backbones are not modified by including hydroxy and/or carboxylic acid groups.

3. The crosslinked aramid polymer of claim 1, wherein the aramid backbones are PPTA.

4. A method for obtaining the crosslinked aramid polymer of claim 1 by polymerizing a monomeric aromatic diamine with a monomeric aromatic diacid, or halide or ester thereof in the presence of poly(meth)acrylic acid, followed by a curing step; or by mixing an aramid polymer with poly(meth)acrylic acid in the presence of sulfuric acid, removing the sulfuric acid followed by a curing step, wherein said diamines and diacids, halides, or esters thereof do not contain additional crosslinkable substituents.

5. The method according to claim 4, wherein prior to polymerization the monomeric aromatic diamine and the monomeric aromatic diacid, or halide or ester thereof, are mixed in a solvent.

6. The method according to claim 5, wherein the solvent is sulfuric acid, NMP, or NMP/$CaCl_2$.

7. The method according to claim 4, wherein the curing step is a thermal curing.

8. The method according to claim 4, wherein the aramid polymer is PPTA.

9. The method according to claim 4, wherein the crosslinked aramid polymer is converted to a fiber or fibrid by a spinning process or to a film by a casting process.

10. A fiber, film, or fibrid comprising the crosslinked aramid polymer of claim 1.

* * * * *